E. R McLUCAS.
WHEEL TRUING DEVICE.
APPLICATION FILED MAR. 27, 1917.
1,272,976.
Patented July 16, 1918.
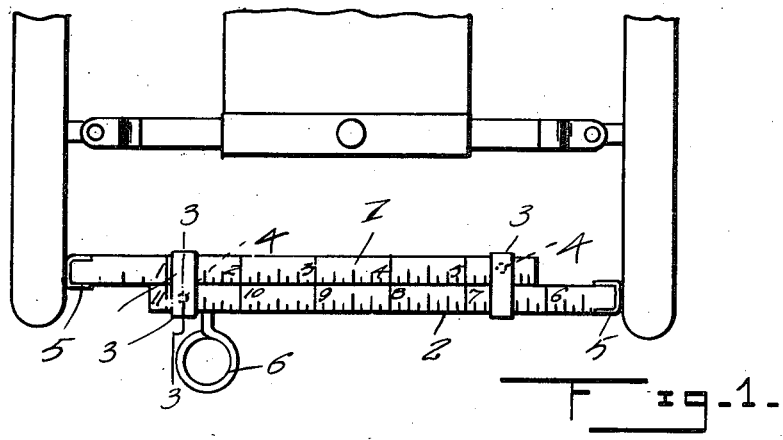
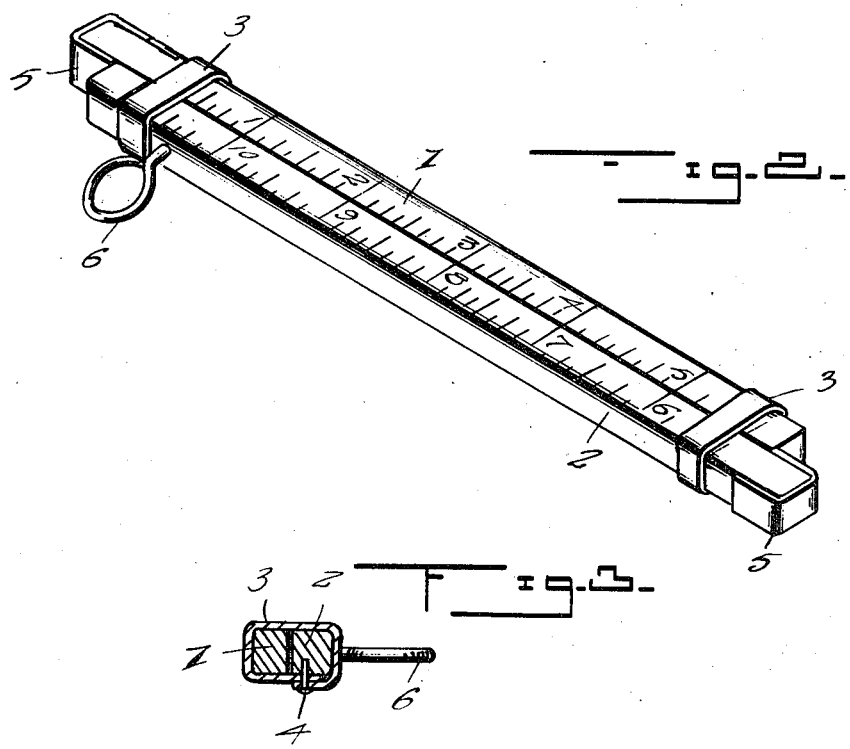
Inventor
E. R. McLucas.
Witnesses

UNITED STATES PATENT OFFICE.

EARL R. McLUCAS, OF NORTH YAKIMA, WASHINGTON.

WHEEL-TRUING DEVICE.

1,272,976.  Specification of Letters Patent.  Patented July 16, 1918.

Application filed March 27, 1917. Serial No. 157,687.

*To all whom it may concern:*

Be it known that I, EARL R. McLUCAS, a citizen of the United States, residing at North Yakima, in the county of Yakima and State of Washington, have invented certain new and useful Improvements in Wheel-Truing Devices; and I do hereby declare the following to be a full, clear, and exact description of the invention, such as will enable others skilled in the art to which it appertains to make and use the same.

This invention relates to a wheel truing device and has for one of its objects the provision of a device of this character, whereby the proper angle or pitch of a front wheel of a motor vehicle may be readily obtained.

Another object of this invention is the provision of a pair of members slidably connected together and having graduations thereon, which are adapted to be placed in engagement with the front wheels of the motor vehicle to determine if they are disposed at a correct angle or pitch.

A further object of this invention is the provision of cuffs for slidably connecting the members together and one of said members being provided with a set screw adapted to engage the other member for holding said members against relative movement so that the device can be set at a desired dimension and the front wheels then trued to correspond with the measurement of said members.

A still further object of this invention is the provision of a wheel truing device of the above stated character, which shall be simple, durable and efficient, and which may be manufactured and sold at a comparatively low cost.

With these and other objects in view, as will become more apparent as the description proceeds, the invention consists of certain novel features of construction, combination and arrangement of parts as will be hereinafter more fully described and claimed.

For a complete understanding of my invention reference is to be had to the following description and accompanying drawing, in which:

Figure 1 is a top plan view of a wheel truing device, constructed in accordance with my invention, illustrating its use upon the front wheels of a motor vehicle, Fig. 2 is a perspective view of the same, Fig. 3 is a transverse sectional view taken on the line 3—3 of Fig. 1.

Referring in detail to the drawing, the numeral 1 indicates a pair of companion members having applied to the top faces thereof graduations for the purpose of obtaining correct adjustment of the members with relation to each other.

Each of the members have secured adjacent their inner ends, cuffs 3 which are adapted to slidably connect the members together. The cuffs 3 being secured to the members by fasteners 4, as shown in Fig. 3.

Substantially U-shaped wear plates 5 are secured to the outer ends of the members and have their arm portions disposed in a plane above the faces of said members for the purpose of engaging the cuffs 3 for limiting the adjusting movement of the members with relation to each other.

A set screw 6 is threaded in one of the members adjacent the inner end thereof and is adapted to be turned into engagement with the other member for holding said members against movement with relation to each other.

In operation, a person familiar with the distance between the wheels of the automobile, moves the sections 1 and 2 in relation to each other until they measure the correct distance. The members 1 and 2 are then placed in close proximity to the wheels and if the wheels are too far apart, they are adjusted until the wear plates upon the ends of the members engage the wheels and if the wheels are too close together they are moved apart until the members 1 and 2 can be placed so as to engage the inner faces of the wheels. The members are then placed between the front wheels as shown in Fig. 1, and if they are not correctly adjusted, they then may be readily moved in the ordinary manner to obtain the correct pitch or angle by adjusting the wheels until they engage the ends of the members 1 which carry the wear plates 5, as shown in Fig. 1.

While I have shown and described the preferred embodiment of my invention, it will be understood that minor changes in construction, combination and arrangement of parts may be made without departing from the spirit and scope of the invention as claimed.

Having thus described my invention, what I claim is:

A wheel truing device comprising a pair of companion members having graduations thereon, a cuff secured to one end of each member and adapted to slidably receive the other member, substantially U-shaped wear plates disposed over the ends of said members and having one arm portion of each disposed in a plane above the faces of the members to abut the cuffs for preventing the members from becoming detached, and a set screw threaded in one of said members and adapted to be turned against the other member for holding said members against relative movement.

In testimony whereof I affix my signature in presence of two witnesses.

EARL R. McLUCAS.

Witnesses:
P. J. BUWALDA,
MAUD E. TENNANT.